United States Patent
Matsuhana et al.

(10) Patent No.: US 11,727,804 B2
(45) Date of Patent: Aug. 15, 2023

(54) METHOD AND PROGRAM PRODUCT FOR DETERMINING WHETHER THERE IS PROBLEM IN RECOGNITION OF MARKER

(71) Applicant: DENSO CORPORATION, Kariya (JP)

(72) Inventors: Ryosuke Matsuhana, Kariya (JP); Yosuke Hattori, Kariya (JP)

(73) Assignee: DENSO CORPORATION, Kariya (JP)

( * ) Notice: Subject to any disclaimer, the term of this patent is extended or adjusted under 35 U.S.C. 154(b) by 105 days.

(21) Appl. No.: 17/157,665

(22) Filed: Jan. 25, 2021

(65) Prior Publication Data

US 2021/0233404 A1 Jul. 29, 2021

(30) Foreign Application Priority Data

Jan. 27, 2020 (JP) .................... 2020-010538

(51) Int. Cl.
*G06T 7/80* (2017.01)
*H05B 47/11* (2020.01)
*B60W 30/06* (2006.01)
*G08G 1/14* (2006.01)
*G06V 20/52* (2022.01)
*G06V 20/58* (2022.01)

(52) U.S. Cl.
CPC ............ *G08G 1/143* (2013.01); *G06T 7/80* (2017.01); *G06V 20/52* (2022.01); *G06V 20/586* (2022.01); *G08G 1/149* (2013.01); *G06T 2207/30204* (2013.01); *G06T 2207/30248* (2013.01); *H05B 47/11* (2020.01)

(58) Field of Classification Search
CPC ..................................................... G08G 1/143
See application file for complete search history.

(56) References Cited

U.S. PATENT DOCUMENTS

| 2017/0096167 | A1* | 4/2017 | Yoon | ..................... G08G 1/143 |
| 2019/0367012 | A1* | 12/2019 | Matta | ..................... G05D 1/0274 |
| 2020/0004257 | A1* | 1/2020 | Kim | ..................... H04W 4/024 |
| 2020/0035102 | A1* | 1/2020 | Satomura | ............. G06V 20/582 |
| 2020/0037301 | A1* | 1/2020 | Park | ..................... H04W 72/046 |
| 2020/0133268 | A1* | 4/2020 | Walsh | ................ B62D 15/0285 |
| 2020/0151895 | A1* | 5/2020 | Kaneko | ..................... G06T 7/90 |

FOREIGN PATENT DOCUMENTS

| JP | 2002-236870 A | 8/2002 |
| JP | 2005-018649 A | 1/2005 |
| JP | 2015-041348 A | 3/2015 |
| JP | 2017-117188 A | 6/2017 |

* cited by examiner

*Primary Examiner* — Joseph H Feild
*Assistant Examiner* — Pameshanand Mahase
(74) *Attorney, Agent, or Firm* — Maschoff Brennan

(57) ABSTRACT

In an automatic parking system, a marker recognizing unit performs recognition of a predetermined number of markers located respectively at predetermined locations in a parking garage. A marker deter miner performs determination of whether there is a problem in recognition of at least one marker in the predetermined number of markers in accordance with information resulting from the recognition performed by the marker detector. An output unit outputs marker state information resulting from the determination performed by the marker determiner.

11 Claims, 7 Drawing Sheets

METHOD AND PROGRAM PRODUCT FOR DETERMINING WHETHER THERE IS PROBLEM IN RECOGNITION OF MARKER

CROSS REFERENCE TO RELATED APPLICATIONS

This application is based on and claims the benefit of priority from Japanese Patent Application No. 2020-10538 filed on Jan. 27, 2020, the disclosure of which is incorporated in its entirety herein by reference.

TECHNICAL FIELD

The present disclosure relates to methods and program products for determining whether there is a problem, i.e. trouble, in recognition of a marker.

BACKGROUND

Development of technologies for Automated Valet Parking (AVP) has been progressed, which automatically navigate a target vehicle to accordingly park the target vehicle in a selected one of parking spaces in a parking garage.

SUMMARY

An automatic parking system according an aspect of the present disclosure includes a marker recognizing unit configured to perform recognition of a predetermined number of markers located respectively at predetermined locations in a parking garage. Each of the predetermined number of markers serves as a navigation landmark to navigate a vehicle.

The automatic parking system includes a marker determiner configured to perform determination of whether there is a problem in recognition of at least one marker in the predetermined number of markers in accordance with information resulting from the recognition performed by the marker detector.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
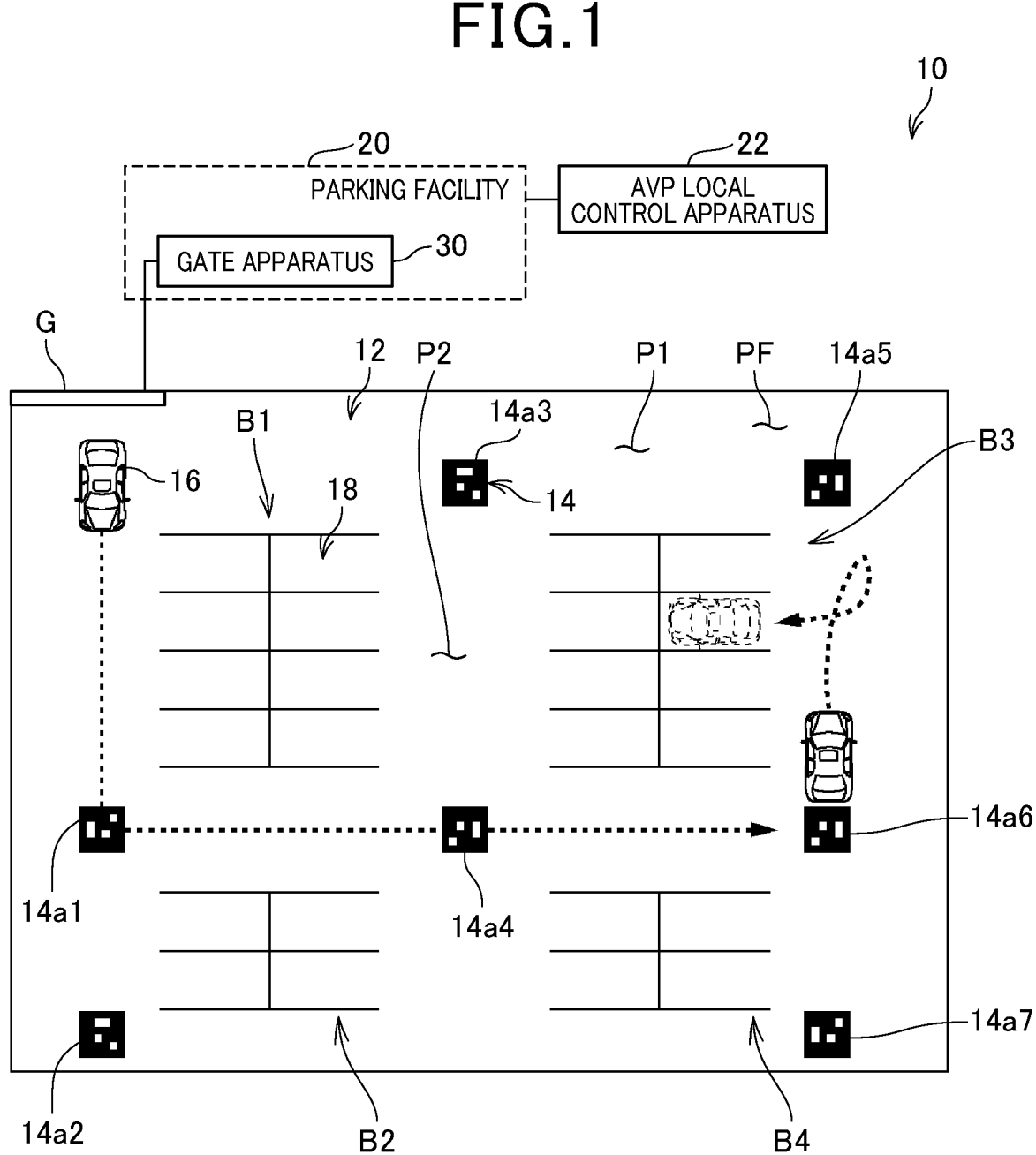
FIG. 1 is a plan view of a parking garage to which an AVP system according to the first embodiment of the present disclosure has been applied.

Japanese Patent Application Publication No. 2015-41348 discloses, as a typical example of the technologies, a parking navigation method.

Specifically, the parking navigation method installed in a target vehicle captures images around the target vehicle, and recognizes, based on the images, navigation landmarks, which are positioned in a parking garage, for navigating the target vehicle to parking spaces.

Then, the parking navigation method navigates, based on the navigation landmarks, the target vehicle toward the parking spaces while capturing images around the target vehicle to thereby recognize, based on the images, parking landmarks. The parking landmarks are positioned in the parking garage for parking the target vehicle to a selected one empty parking space in the parking spaces. In accordance with the recognized parking landmarks, the parking navigation method parks the target vehicle in the selected empty parking space.

The above parking navigation method, which navigates a target vehicle in accordance with markers in a parking garage recognized from images captured around the target vehicle, may require maintenance on each marker. A marker is a general term for landmarks, marking objects, and marking symbols, such as marking lines. This maintenance of each marker aims to reliably detect and recognize the corresponding marker to accordingly prevent problems in recognition of the corresponding marker. Such maintenance of a marker is, for example, to eliminate stains on the marker and/or remove obstacles that inhibit detection of the marker.

Unfortunately, the greater the size of the parking garage, the larger the number of markers, resulting in larger time and effort of parking managers who visibly determine whether there is a problem in recognition of the markers.

In view of the circumstances set forth above, an aspect of the present disclosure seeks to provide methods, systems, and program products for determining whether there is a problem in recognition of markers, which are each capable of easily identifying at least one marker in the markers, for which maintenance is required.

According to a first exemplary aspect of the present disclosure, there is provided an automatic parking system for navigating a vehicle in a parking garage to park the vehicle in a parking space.

The automatic parking system includes a marker recognizing unit configured to perform recognition of a predetermined number of markers located respectively at predetermined locations in the parking garage. Each of the predetermined number of markers serves as a navigation landmark to navigate the vehicle.

The automatic parking system includes a marker determiner configured to perform determination of whether there is a problem in recognition of at least one marker in the predetermined number of markers in accordance with information resulting from the recognition performed by the marker detector.

The automatic parking system includes an output unit configured to output marker state information resulting from the determination performed by the marker determiner.

According to a second exemplary aspect of the present disclosure, there is provided a method of determining whether there is a problem in recognition of a marker used for navigating a vehicle in a parking garage to park the vehicle in a parking space.

The method includes (1) Performing recognition of a predetermined number of markers located respectively at predetermined locations in the parking garage, each of the predetermined number of markers serving as a navigation landmark to navigate the vehicle (2) Performing determination of whether there is a problem in recognition of at least one marker in the predetermined number of markers in accordance with information resulting from the recognition performed by the marker detector (3) Outputting marker state information resulting from the determination performed by the marker determiner According to a third exemplary aspect of the present disclosure, there is provided a computer-readable program product that includes a non-transitory computer-readable storage medium, and a set of computer program instructions stored in the computer-readable storage medium.

The instructions cause a computer to

1. Perform recognition of a predetermined number of markers located respectively at predetermined locations in the parking garage, each of the predetermined number of markers serving as a navigation landmark to navigate the vehicle
2. Perform determination of whether there is a problem in recognition of at least one marker in the predetermined number of markers in accordance with information resulting from the recognition performed by the marker detector
3. Output marker state information resulting from the determination performed by the marker determiner Each of the first to third exemplary aspects of the present disclosure makes it possible to easily identify at least one marker with a need for maintenance in all the predetermined number of markers used for navigating the vehicle in the parking garage.

The following describes exemplary embodiments of the present disclosure with reference to the accompanying drawings. In the embodiments, like parts between the embodiments, to which like reference characters are assigned, are omitted or simplified to avoid redundant description.

First Embodiment

The following describes an example of the configuration of an Automated Valet Parking (AVP) system 10 according to the first embodiment of the present disclosure with reference to FIGS. 1 to 5.

FIG. 1 schematically illustrates a top view of a parking garage, i.e. a parking lot, 12 to which the AVP system 10 has been applied.

The AVP system 10 is configured to navigate one or more vehicles 16 using a plurality of markers 14 located in the parking garage 12.

The one or more vehicles 16 that the AVP system 10 can navigate will also be called "AVP vehicles 16", and the parking garage 12 can be set up next to a commercial facility, a public facility, or a condominium building. The parking garage 12 essentially includes at least one two-dimensional parking floor PF that includes a plurality of parking spaces 18 arranged thereon. On the at least one two-dimensional parking floor PF, the one or more AVP vehicles 16 can autonomously travel to be parked in a selected one of the parking spaces 18.

As the parking garage 12, a multilevel parking garage or an underground garage can be used. The multilevel parking garage is comprised of multiple parking floors PF where the one or more AVP vehicles 16 can be parked; the multiple parking floors respectively have different levels. The multilevel parking garage is also comprised of ramps that enable the one or more AVP vehicles 16 to move from one level to another level.

The AVP system 10 of the first embodiment includes a plurality of markers 14 provided in the parking garage 12, one or more of which are placed on the at least one two-dimensional parking floor PF, which will be simply referred to as a parking floor PF. Each of the markers 14 serves as a navigation landmark for navigating an AVP vehicle 16, which has entered the parking garage 12, to the parking spaces 18.

When an AVP vehicle 16 has entered the parking garage 12 as a parking target vehicle 16, the parking target vehicle 16 autonomously travels, in accordance with travel route data, on the parking floor PF while detecting the markers 14 and recognizing the current position of the parking target vehicle 16 on map data to thereby reach a selected one of the parking spaces 18.

The map data represents positional information in the parking garage 12 including positional information about each marker 13 and positional information about each parking space 18. The map data is sent, from an AVP local control apparatus described later, to an AVP vehicle 16 when the AVP vehicle 16 is entering the parking garage 12.

The travel route data represents a selected travel route from the current position of a parking target vehicle 16 that has entered the parking garage 12 to a selected one of the parking spaces 18. That is, the travel route data is generated by the AVP local control apparatus and is sent therefrom to the parking target vehicle 16 when the parking target vehicle 16 is entering the parking garage 12.

Each marker 14 according to the first embodiment is, for example, comprised of a two-dimensional code having a quadrangular shape. As an example, each marker 14 is comprised of a two-dimensional label with opposing first and second major surfaces, a black-colored quadrangular base printed on the first major surface, i.e. a label surface, and one or more white-colored quadrangular marks printed in the black-colored quadrangular base. The printed one or more white-colored quadrangular marks of each marker 14 show a unique marker identification (ID) that represents one or more allocated navigation functions thereof, and the location thereof in the parking garage 12.

For example, as illustrated in FIG. 1, the parking floor PF has a substantially quadrangular shape, and has an entrance/exit gate G through which AVP vehicles 16 can enter the parking floor PF or exit from the parking floor PF. In the example of the parking floor PF illustrated in FIG. 1, the entrance/exit gate G is located at the upper left corner of the parking floor PF. Although the parking floor PF has the common entrance/exit gate G in the example illustrated in FIG. 1, the parking floor PF can have an entrance gate and an exit gate separated from each other.

The parking floor PF has a substantially rectangular-loop shaped passage P1 communicating with the entrance/exit gate G, and also has, for example, first to fourth parking-space blocks B1 to B4 arranged in the form of a two-by-two matrix with a cross-shaped passage P2 partitioning the first to fourth parking-space blocks B1 to B4 from each other.

The first parking-space block B1 located closest to the gate G is comprised of eight parking spaces 18 arranged in the form of a four-by-two matrix, and the second parking-space block B2 located closest to the lower left corner of the parking floor PF is comprised of four parking spaces 18 arranged in the form of a two-by-two matrix. The third parking-space block B3 located closest to the upper right corner of the parking floor PF is comprised of eight parking spaces 18 arranged in the form of a four-by-two matrix, and the fourth parking-space block B4 located closest to the lower right corner of the parking floor PF is comprised of four parking spaces 18 arranged in the form of a two-by-two matrix.

In FIG. 1, the markers 14 include first to seventh makers 14a1 to 14a7.

The first marker 14a1 is located on the passage P1 of the parking floor PF to be closest to the lower left corner of the first parking-space block B1, and the second marker 14a2 is located on the passage P2 of the parking floor PF to be closest to the lower left corner of the second parking-space block B2.

The third marker 14a3 is located on the passage P1 of the parking floor PF to be closest to both (i) the upper right corner of the first packing-space block B1 and (ii) the upper left corner of the third parking-space block B3.

The fourth marker 14a4 is located on the passage P2 of the parking floor PF at the same distance from each of the first to fourth parking-space blocks B1 to B4.

The fifth marker 14a5 is located on the passage P1 of the parking floor PF to be closest to the upper right corner of the third packing-space block B3.

The sixth marker 14a6 is located on the passage P1 of the parking floor PF to be closest to both (i) the lower right corner of the third packing-space block B3 and (ii) the upper right corner of the fourth parking-space block B4.

The seventh marker 14a7 is located on the passage P1 of the parking floor PF to be closest to the lower right corner of the fourth packing-space block B4.

The number of the markers 14, i.e. the first to seventh markers 14a1 to 14a7, the locations of the respective markers 14a1 to 14a7, and the colors of the respective markers 14a1 to 14a7, which are illustrated in FIG. 1, are an example. That is, another number of markers 14 can be located on the parking floor PF, and the markers 14 can be located at respective positions on the parking floor PF, which are different from their positions illustrated in FIG. 1. The color of each marker 14 can be freely selected one of various colors.

For example, a marker 14 can be located at each predetermined location of the parking floor PF where a parking target vehicle 16 traveling at the corresponding predetermined location can go straight or turn right or turn left. The markers 14 can be located on the parking floor PF for the respective parking blocks B1 to B7 or for the respective parking spaces 18.

The markers 14 according to the first embodiment are mounted on the parking floor PF, but, if the parking garage 12 is configured as a covered parking garage, the markers 14 can be mounted to one or more poles that support the cover of the covered parking garage.

Each marker 14 can have one of various shapes, such as a triangle shape, a circular shape, or a multangular shape, except for the quadrangular shape. Each marker 14 can be comprised of one or more arbitrary-shaped and/or arbitrary-colored marks, or comprised of one or more number symbols and/or one or more letters.

That is, each marker 14 can be freely designed as long as, when recognizing the corresponding marker 14, a parking target vehicle 16 can obtain the marker ID of the corresponding marker; the marker ID represents one or more allocated navigation functions thereof, and the location thereof in the parking garage 12.

As described above, when an AVP vehicle 16 enters the parking garage 12 as a parking target vehicle 16, the parking target vehicle 16 detects at least one of the markers 14 and recognizes the maker ID stored in the corresponding at least one of the markers 14 in order to autonomously travel to be parked in one of the selected parking spaces 18.

If, however, there is a problem, i.e. trouble, in recognition of at least one marker 14, a parking target vehicle 16 that has entered the parking garage 12 may not detect at least one marker 14 itself or properly recognize the maker ID stored in the at least one marker 14 although the at least one marker has been detected.

Note that a problem or trouble in recognition of a marker 14 represents, for example, (i) grime on the marker 14, (ii) the marker 14 being at least partly peeled off, (iii) the marker 14 being at least partly scratched, (iv) the marker 14 being at least partly faded in color, (v) one or more obstacles existing to prevent detection or recognition of the marker 14, and (vi) a surrounding environment, such as insufficient illumination around the marker 14, preventing recognition of the marker 14.

From this viewpoint, the AVP system 10 of the first embodiment is configured to determine whether there is a problem in recognition of each marker 14, and output information about a result of the determination to thereby show whether there is a need of maintenance of each marker 14.

Figure 2:
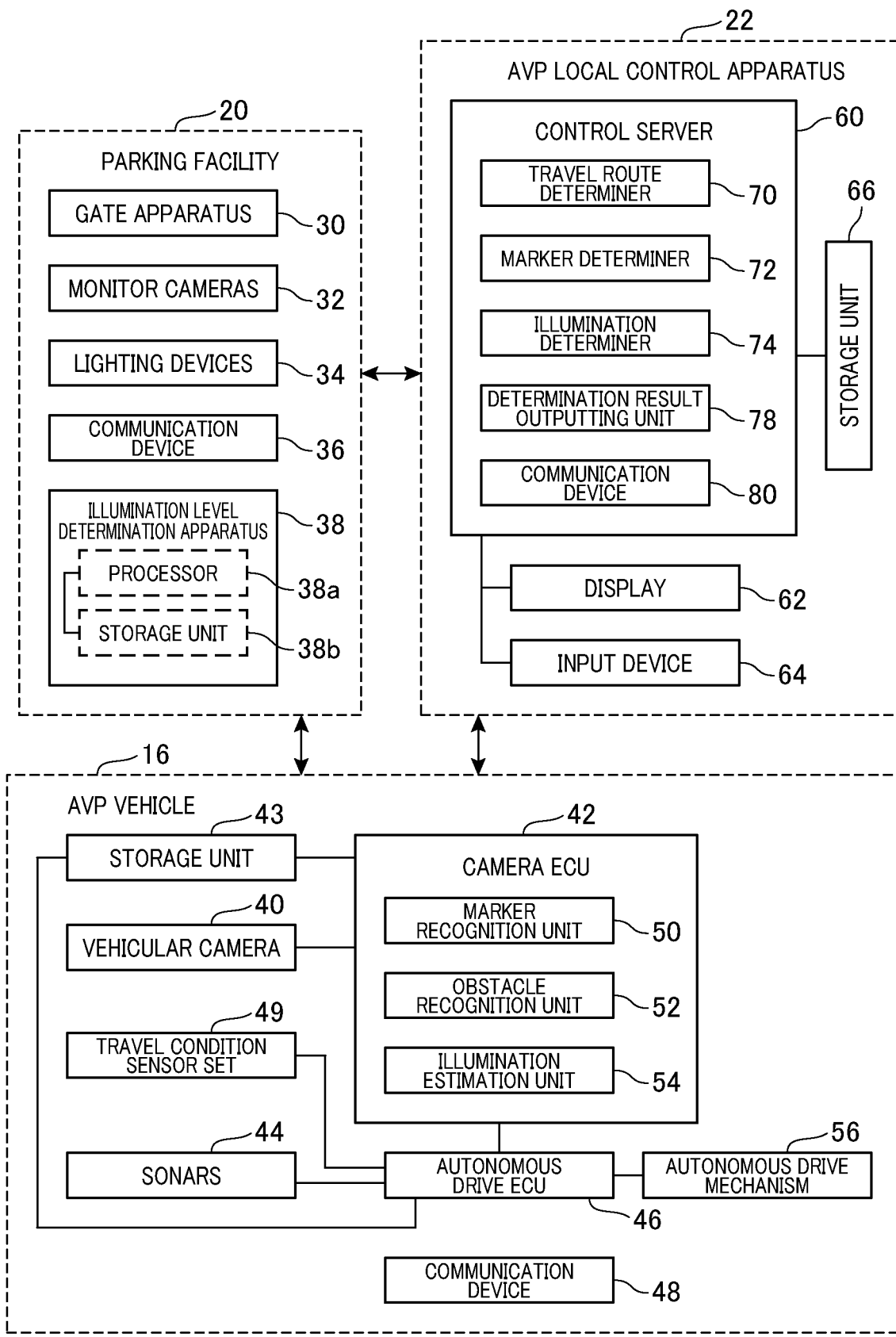
FIG. 2 is a block diagram schematically illustrating an example of the electrical configuration of the AVP system according to the first embodiment.
Figure 3:
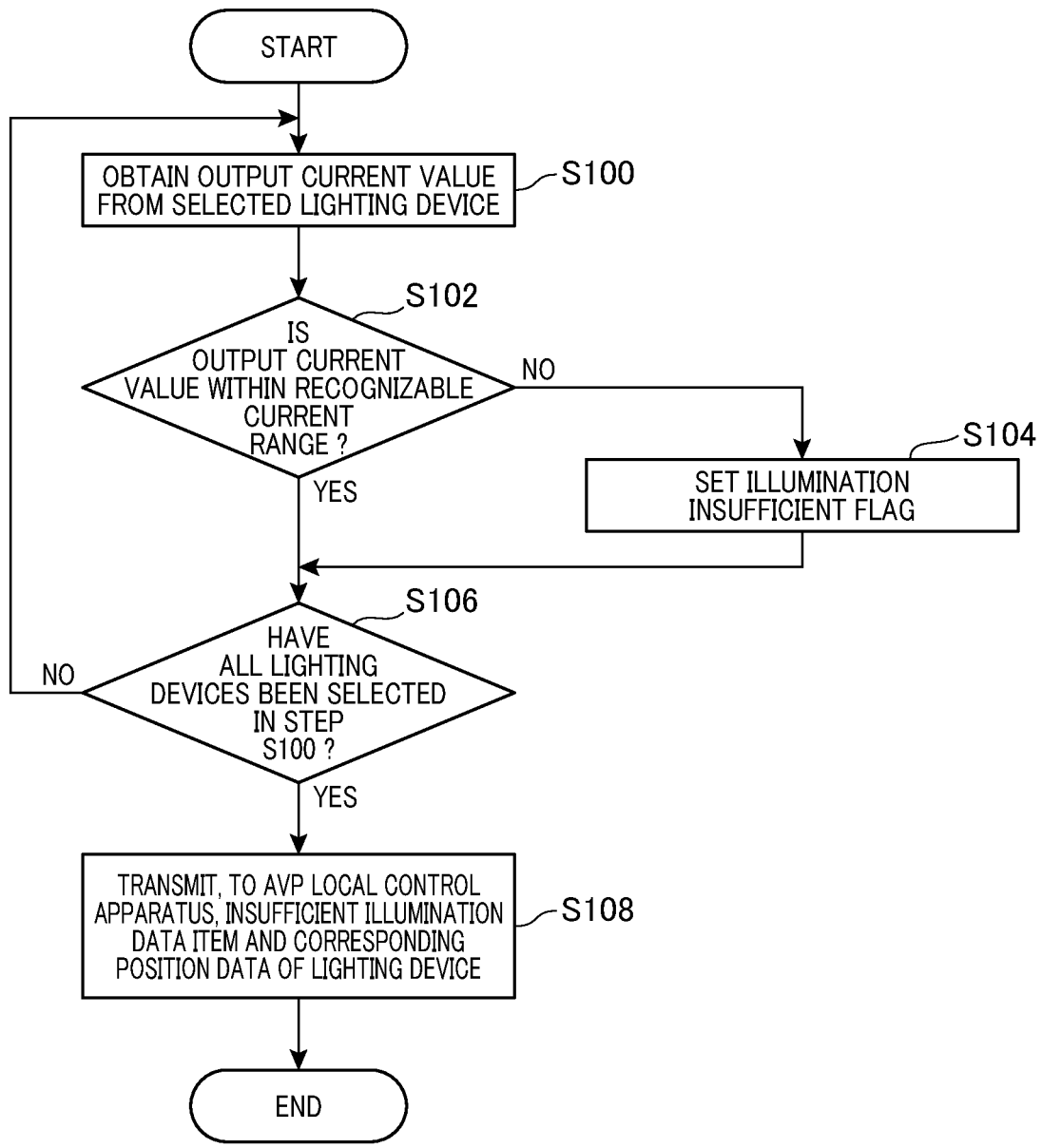
FIG. 3 is a flowchart schematically illustrating an illumination level determination routine carried out by an illumination level determination apparatus illustrated in FIG. 2 according to the first embodiment.

FIG. 2 schematically illustrates an example of the electrical configuration of the AVP system 10 according to the first embodiment.

As illustrated in FIG. 2, the AVP system 10 includes a parking facility 20, an AVP local control apparatus 22, and a parking target vehicle 16 that has entered the parking garage 12.

The parking facility 20 is comprised of a gate apparatus 30, monitor cameras 32, lighting devices 34, a communication device 36, and an illumination level determination device 38.

Each of the gate apparatus 30, monitor cameras 32, lighting devices 34, communication device 36, and illumination level determination device 38 provided by the parking facility 20 can be implemented by at least one hardware device, or at least one programmed logic circuit, or at least one processor that runs programs stored in, for example, a non-transitory tangible storage media, or the combination of them.

For example, if one of the components 32, 34, 36, and 38 is comprised of a hardware electronic circuit, the hardware electronic circuit can be implemented by at least one digital circuit including many logic gates and/or an analog circuit.

The gate apparatus 30 includes, for example, a gate mechanism, a ticket-issuing machine, and a parking-fee charging device.

The gate mechanism is located at the entrance/exit gate G, and is configured to

1. Open the entrance/exit gate G to thereby permit an AVP vehicle 16 to enter the parking garage 12 or 2. Close the entrance/exit gate G to thereby prevent the AVP vehicle 16 from entering the parking garage 12.

The ticket-issuing machine is configured to issue a ticket for an AVP vehicle 16 that is ready to enter the parking garage 12.

The parking-fee charging device is configured to charge a parking fee as a function of a parking time of a parking target vehicle 16, which has entered the parking garage 12, in the parking garage 12.

If the parking garage 12 has plural entrance/exit gates, the gate mechanism can be provided as plural gate mechanisms and can be provided for the respective gates.

If the parking garage 12 has an entrance gate and an exit gate separated therefrom, the ticket-issuing machine and parking-fee charging device can be provided as ticket-issuing machines and parking-fee charging devices, and the ticket-issuing machines can be provided for the respective entrance gate and exit gate, and the ticket-issuing machines can be provided for the respective entrance gate and exit gate.

The parking garage 12 can eliminate installation of the gate apparatus 30. For example, if the parking garage 12 is configured as a free parking lot, the parking garage 12 has no gate apparatuses. If the parking garage 12 is dedicated to, for example, a condominium building, the parking garage 12 is equipped with the gate apparatus 30, but cannot be equipped with the ticket-issuing device and charging machine.

Each of the monitor cameras 32 is arranged to capture images from above of the parking floor PF; each of the captured images monitors at least an allocated part of the interior of the parking garage 12. A single monitor camera 32 can be used.

For example, the parking garage 12 is equipped with poles, and the monitor cameras 32 can be mounted to the respective poles. Each of the monitor cameras 32 mounted to the corresponding pole is configured to capture images of an allocated part of the interior of the parking garage 12 or the whole interior of the parking garage 12. If the parking garage 12 is equipped with poles and a roof supported by the poles, the monitor cameras 32 can be mounted to the poles and/or the ceiling of the roof. Each of the monitor cameras 32 mounted to the corresponding pole or ceiling is configured to capture images of (i) an allocated part of the interior of the parking garage 12 or (ii) the whole interior of the parking garage 12.

Each of the lighting devices 34 is arranged at a predetermined position in the parking garage 12 to light, i.e. illuminate, the interior of the parking garage 12 from above of the parking floor PF. For example, the parking garage 12 is equipped with poles, and the lighting devices 34 can be mounted to the respective poles. Each of the lighting devices 34 mounted to the corresponding pole is configured to illuminate an allocated part of the interior of the parking garage 12 or the whole interior of the parking garage 12. If the parking garage 12 is equipped with poles and a roof supported by the poles, the lighting devices 34 can be mounted to the poles and/or ceiling of the roof. Each of the lighting devices 34 mounted to the corresponding pole or ceiling is configured to illuminate an allocated part of the interior of the parking garage 12 or the whole interior of the parking garage 12.

In particular, each of the lighting devices 34 is comprised of a current supply unit and a light emitting device, and is configured such that the light emitting device emits light based on an output current from the current supply unit. That is, the intensity, i.e. illumination level, of the light emitted from the light emitting device depends on a value of the output current from the current supply unit.

The illumination level determination apparatus 38 is communicable with the lighting devices 34, and is configured to determine whether an illumination level, i.e. illumination state, of the light emitted from each of the lighting devices 34 is appropriate for detecting the markers 14.

For example, the illumination level determination apparatus 38 communicates with each lighting device 34 to thereby obtain a value of the output current from the current supply unit of the corresponding lighting device 34, and determine, based on the value of the output current from the current supply unit of each lighting device 34, whether the illumination level, i.e. illumination state, of the light emitted from the corresponding lighting device 34 is appropriate for detecting the markers 14.

Specifically, the negative determination, which represents that the illumination level, i.e. illumination state, of the light emitted from one of the lighting devices 34 is inappropriate for detecting the markers 14, shows that the illumination level of the light emitted from the one of the lighting devices 34 is insufficient, i.e. shows that there is an insufficient level of the light emitted from the one of the lighting devices 34.

The communication device 36 is communicable with, by wire or by radio, the gate apparatus 30, the monitor cameras 32, the lighting devices 34, the illumination level determination apparatus 38, and the AVP local control apparatus 22.

Specifically, the communication device 36 is configured to receive data from each of the other apparatuses 30, 32, 34, 38, and 22, and transmit data to each of the other apparatuses 30, 32, 34, 38, and 22.

For example, the gate apparatus 30 is configured to transmit, to the communication device 36, first gate data representing the working state of the gate mechanism.

The gate apparatus 30 is also configured to transmit, to the communication device 36, second gate data representing information about the ticket issued for a parking target vehicle 16 that has entered the parking garage 12.

The gate apparatus 30 is further configured to transmit, to the communication device 36, third gate data representing information about the parking fee charged for a parking target vehicle 16 parked in the parking garage 12.

Each of the monitor cameras 32 is configured to transmit, to the communication device 36, a monitor image in a predetermined data format each time the corresponding monitor camera 32 captures the monitor image.

Each of the lighting devices 34 is configured to transmit, to the communication device 36, an illumination level of the light emitted from the corresponding light emitting device; the illumination level has a predetermined data format. Each lighting device 34 according to the first embodiment is configured to transmit, to the communication device 36, the value of the output current from the current supply unit as a parameter of the illumination level.

The communication device 36 is configured to receive

1. The first gate data, second gate date, and third gate data transmitted from the gate apparatus 30
2. The monitor image transmitted from each monitor camera 32
3. The illumination level transmitted from each lighting device 34

The communication device 36 is also configured to transmit, to the AVP local control apparatus 22, the first gate data, second gate data, third gate data, the monitor image from each monitor camera 32, and the illumination level from each lighting device 34.

In particular, as illustrated in FIG. 2, the illumination level determination apparatus 38 is comprised of, for example, a processor 38a and a storage unit 38b comprised of, for example, a read only memory (ROM) and a random-access memory (RAM) and communicably connected to the processor 38a.

The storage unit 38b, which serves as, for example, a non-transitory computer-readable storage media, stores (i) various programs including an illumination level determination program, and (ii) position data of each lighting device 34; the position data of each lighting device 34 represents an installation position of the corresponding lighting device 34 in the parking garage 12. The processor 38a is programmed to run the illumination level determination program every predetermined interval of, for example, 30 minutes to thereby perform an illumination level determination routine illustrated in, for example, FIG. 3.

When starting the illumination level determination routine, the processor 38a of the determination apparatus 38 obtains, from a selected one of the lighting devices 34, the illumination level in step S100. For example, in step S100, the processor 38a of the determination apparatus 38 obtains, as a parameter indicative of the illumination level from the selected lighting device 34, the value of the output current of the selected lighting device 34.

Next, the processor 38a of the determination apparatus 38 determines whether the value of the output current of the selected lighting device 34 is within a predetermined recognizable current range that is defined between a lower current limit and an upper current limit inclusive in step S102.

In response to determination that the value of the output current of the selected lighting device 34 is within the predetermined recognizable current range (YES in step S102), the illumination level determination routine proceeds to step S106. Otherwise, in response to determination that the value of the output current of the selected lighting device 34 is outside the predetermined recognizable current range (NO in step S102), the illumination level determination routine proceeds to step S104.

Note that the predetermined recognizable current range for each lighting device 34 is defined as follows. Specifically, if a vehicular camera 40, which will be described later, installed in a parking target vehicle 16 captures, with an illumination level of light outputted from the corresponding lighting device 34 within the predetermined recognizable current range, a monitor image of at least one normal marker 14 with no problems, the AVP local control apparatus 22 is capable of recognizing the at least one normal marker 14 in accordance with the captured monitor image.

In response to the negative determination in step S102, the processor 38a of the determination apparatus 38 determines that the selected lighting device 34 has improper illumination, thus setting an insufficient illumination flag in the storage unit 38b for the selected lighting device 34, and generates an insufficient illumination data item comprised of the position data of the selected lighting device 34 stored in the storage unit 38b and the insufficient illumination flag in step S104.

Then, the processor 38a of the determination apparatus 38 stores the insufficient illumination data item in the storage unit 38b so as to correlate with the selected lighting device 34 in step S104. Thereafter, the illumination level determination routine proceeds to step S106.

Note that a flag used in the specification, such as the insufficient illumination flag, is, for example, a bit having a logical high level, represented by 1 or ON, or a logical low level, represented by 0 or OFF. Setting a flag represents assigning the flag to the high level of 1 or maintain the flag in the high level of 1, and clearing a flag represents assigning the flag to the low level of 0 or maintaining the flag in the low level of 0. The initial value of a flag used in the specification is set to the low level of 0.

Following the operation in step S102 or S104, the processor 38a of the determination apparatus 38 determines whether all the lighting devices 34 have been selected in step S100, i.e., whether all the lighting devices 34 have been subjected to the determination in step S102, in step S106.

In response to determination that all the lighting devices 34 have not been subjected to the determination in step S102 (NO in step S106), the processor 38a of the determination apparatus 38 returns to the operation in step S100, and repeatedly performs the sequence of the operations from step S100 to step S106. Specifically, in step S102 of each sequence, the processor 38a of the determination apparatus 38 selects, from the lighting devices 34, one lighting device 34 that has not been subjected to the determination in step S102 in step S100.

Otherwise, in response to determination that all the lighting devices 34 have been subjected to the determination in step S102 (YES in step S106), the illumination level determination routine proceeds to step S108.

In step S108, the processor 38a of the determination apparatus 38 transmits, to the AVP local control apparatus 22, the at least one insufficient illumination data item and position data of at least one lighting device 34 corresponding to the at least one insufficient illumination data item if the at least one insufficient illumination data item has been stored in the storage unit 38b, and thereafter, terminates the illumination level determination routine in step S108.

Otherwise, if no insufficient illumination data items have been stored in the storage unit 38b, the processor 38a of the determination apparatus 38 terminates the illumination level determination routine in step S108.

Note that, as described above, the position data of each lighting device 34 represents the installation position of the corresponding lighting device 34 in the parking garage 12. A unique number previously assigned to each lighting device 34 can be used as the position data of the corresponding lighting device 34, which represents the installation position of the corresponding lighting device 34 in the parking garage 12.

As described above, the unique marker IDs (identifications) can be previously assigned to the respective markers 14; the marker ID assigned to each marker 14 represents the one or more allocated navigation functions of the corresponding marker 14, and the location of the corresponding marker 14 in the parking garage 12.

At that time, at least one marker 14 whose location is adjacent to the position data of each lighting device 34 can be stored in the AVP local control apparatus 22 such that the maker ID of the at least one marker 14 correlates with the position data of the corresponding lighting device 34. This enables the AVP local control apparatus 22 to identify that there is a failure in at least one lighting device 34, thus identifying at least one marker 14 that is negatively impacted by the at least one faulty lighting device 34.

Next, the following describes an example of the configuration of each AVP vehicle 16 with reference to FIG. 2.

As illustrated in FIG. 2, the AVP vehicle 16 includes at least one vehicular camera 40, a camera electronic control unit (ECU) 42, a storage unit 43, sonars 44, an autonomous drive ECU 46, a communication device 48, a travel condition sensor set 49, and an autonomous drive mechanism 55.

Each of the components 40, 42 to 44, 46, 48, 49, and 55 installed in the AVP vehicle 16 can be implemented by at least one hardware device, or at least one programmed logic circuit, or at least one processor that runs programs stored in, for example, a non-transitory tangible storage media, or the combination of them.

For example, if one of the components 40, 42 to 44, 46, 48, 49, and 55 is comprised of a hardware electronic circuit, the hardware electronic circuit can be implemented by at least one digital circuit including many logic gates and/or an analog circuit.

The at least one vehicular camera 40 is mounted to the front end of the AVP vehicle 16. The at least one vehicular camera 40 is configured to capture images, i.e. travel images, of a front view and its surrounding views of the AVP vehicle 16 while traveling, and send, to the camera ECU 42, the captured travel images. The at least one vehicular camera 40 additionally serves as a first detection unit for detecting at least one marker 14 and also serves as a second detection unit for detecting obstacles, at least one of which inhibits detection of at least one marker 14.

The camera ECU 42 is configured to analyze the travel images obtained by the at least one vehicular camera 40 to thereby perform predetermined image recognition tasks.

In particular, the camera ECU 42 according to the first embodiment functionally includes a marker recognition unit 50, an obstacle recognition unit 52, and an illumination estimation unit 54.

The marker recognition unit 50 is configured to perform a known recognition task of the travel images to thereby recognize the markers 14.

Specifically, the marker recognition unit 50 performs the recognition task of the travel images to thereby recognize black-colored quadrangular objects, each of which contains one or more white-colored quadrangular marks therein, as markers 14.

Then, the marker recognition unit 50 recognizes, based on the one or more white-colored quadrangular marks of each of the recognized markers 14, the marker ID thereof.

While a parking target vehicle 16, which has entered the parking garage 12, has moved to a selected one of the parking spaces 18, the marker recognition unit 50 creates list of the marker IDs of the markers 14 recognized thereby, and updates the list each time the marker recognition unit 50 recognizes at least one new marker ID of at least one new marker 14. Then, the marker recognition unit 50 can periodically send the list of the marker IDs of the recognized markers 14, before completion of the list, to the AVP local control apparatus 22, or can send only a complete list of the marker IDs of the recognized markers 14 to the AVP local control apparatus 22. Hereinafter, data of the list of the marker IDs will also be referred to as a recognized marker ID list.

The obstacle recognition unit 52 is configured to perform a known recognition task of the travel images to thereby determine whether there is at least one obstacle located inhibiting detection of at least one marker 14. Upon determining that there is at least one obstacle located inhibiting detection of at least one marker 14, the obstacle recognition unit 52 is configured to generate obstacle location data indicative of the location of the at least one obstacle in the parking garage 12. The obstacle recognition unit 52 is also configured to send, to the AVP local control apparatus 22, the obstacle location data.

The obstacle recognition unit 52 can be configured to perform the known recognition task of acoustic echo pulses resulting from reflection of acoustic pulses from one or more objects including at least one obstacle located inhibiting detection of at least one marker 14; the acoustic pulses are outputted from each sonar 44 described later.

The illumination estimation unit 54 is configured to estimate, based on the travel images, the illumination level of a marker-surrounding region around each marker 14, and generate an illumination data item for each marker 14; the illumination data item for each marker 14 includes the estimated illumination level of the marker-surrounding region around the corresponding marker 14 correlating with the marker ID of the corresponding marker 14.

The sonars 44 are mounted to the respective front end and rear end of the AVP vehicle 16.

Each of the sonars 44 is configured to output acoustic pulses toward the corresponding one of the forward direction and the rearward direction, and receive acoustic echo pulses resulting from reflection of the outputted acoustic pulses from at least one object located around the AVP vehicle 16. Then, each of the sonars 44 is configured to detect a distance from the corresponding one of the sonars 44 to the at least one object located around the AVP vehicle 16, thus generating object information about the detected distance from the corresponding one of the sonars 44 to the at least one object.

Each of the sonars 44 can be configured to detect at least one obstacle located inhibiting detection of at least one marker 14 in accordance with acoustic echo pulses resulting from reflection of the outputted acoustic pulses from the at least one obstacle.

The autonomous drive mechanism 56 includes various actuators including motors, an autonomous brake system, an autonomous steering system, and other autonomous drive devices, and is configured to autonomously drive the AVP vehicle 16.

The autonomous drive ECU 46 is configured to receive, as autonomous travel data items, the following information/data items:

1. The map data sent from the AVP local control apparatus 22 via the communication device 48

2. The travel route data sent from the AVP local control apparatus 22 via the communication device 48

3. A result of recognition of the markers 14 obtained by the camera ECU

4. A result of detection of at least one object and/or at least one obstacle obtained by the camera ECU 42

5. The object information generated by each of the sonars 44

6. Other information items, i.e. data items, sent from one or more other devices installed in the AVP system 10

Then, the autonomous drive ECU 46 is configured to cause, based on the autonomous travel data items, the autonomous drive mechanism 55 of the AVP vehicle 16 to autonomously travel toward a selected parking space 18 specified by the travel route data.

The travel condition sensor set 49 includes various sensors that measure various travel condition parameters that represent the travel conditions of the AVP vehicle 16.

The communication device 48 is communicable with, by wire or radio, the components 40, 42, 44, and 46 of the AVP vehicle 16, and also is communicable with, by radio, the components of the parking facility 20 and with, by radio, the AVP local control apparatus 22.

In particular, the communication device 48 is configured to receive the result of recognition of the markers 14 obtained by the camera ECU 42, the recognized marker ID list, the illumination data item for each marker 14 estimated by the illumination estimation unit 54, and the travel condition parameters measured by the travel condition sensor set 49.

The communication device 48 is also configured to transmit, to the AVP local control apparatus 22, the received data items including (i) the result of recognition of the markers 14, the recognized marker ID list, the illumination data item for each marker 14, and the travel condition parameters.

The communication device 48 is further configured to receive the map data and the travel route data when the map data and the travel route data are sent from the AVP local control apparatus 22.

The storage unit 43 is comprised of, for example, a read only memory (ROM) and a random-access memory (RAM), and is communicably connected to each of the camera ECU 42 and the autonomous drive ECU 46.

The storage unit 43, which serves as, for example, a non-transitory computer-readable storage media, stores various programs including a marker-ID list transmitting program.

The camera ECU 42 is programmed to run some programs allocated therefor to thereby perform predetermined routines respectively corresponding to the programs. Similarly, the autonomous drive ECU 46 is programmed to run some programs allocated therefor to thereby perform predetermined routines respectively corresponding to the programs.

Figure 4:
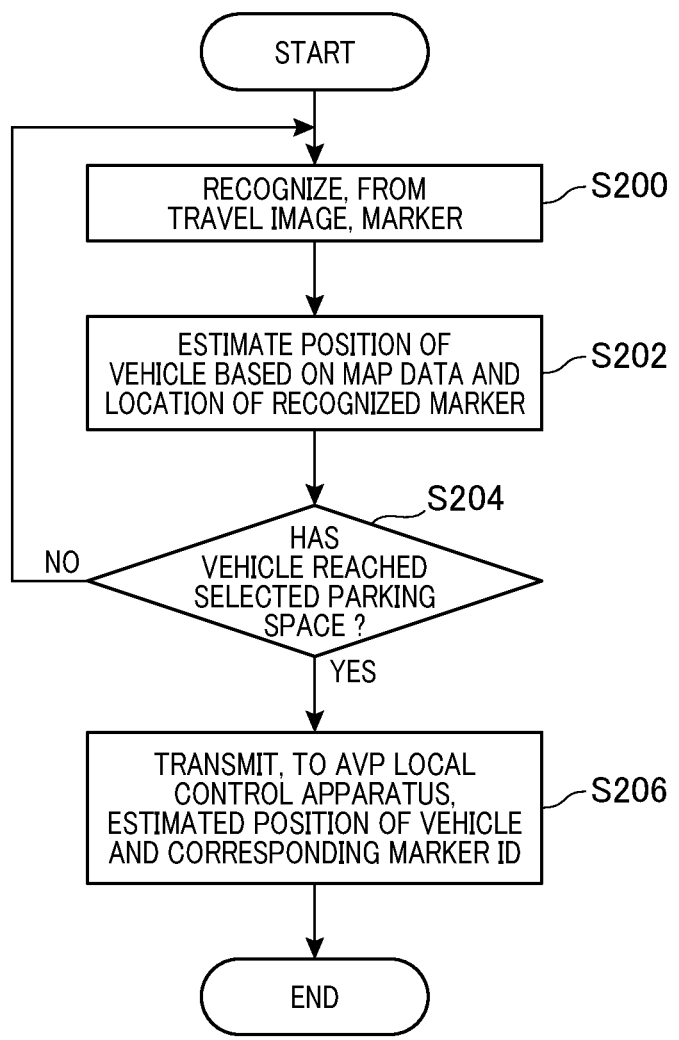
FIG. 4 is a flowchart schematically illustrating a marker-ID list transmitting routine cooperatively carried out by a camera ECU and an autonomous drive ECU of an AVP vehicle illustrated in FIG. 2 according to the first embodiment.

In particular, the camera ECU 42 and the autonomous drive ECU 46 are cooperatively programmed to run the marker-ID list transmitting program stored in the storage unit 43 to thereby perform a marker-ID list transmitting routine illustrated in, for example, FIG. 4. The marker-ID list transmitting routine transmits, to the AVP local control apparatus 22, each marker ID stored in the recognized marker ID list correlating with a corresponding estimated position of the parking target vehicle 16.

For example, when an AVP vehicle 16 has just entered the parking garage 12 via the entrance/exit gate G as a parking target vehicle 16, the autonomous drive ECU 46 receives, from the AVP local control apparatus 22, the travel route data. Then, the autonomous drive ECU 46 causes the autonomous drive mechanism 56 to start autonomous drive of the parking target vehicle 16 in accordance with the travel route data.

In response to the start of the autonomous drive of the parking target vehicle 16, the camera ECU 42 starts the marker-ID list transmitting routine.

When starting the marker-ID list transmitting routine, the camera ECU 42 serves as the marker recognition unit 50 to perform the recognition task of a travel image to thereby determine whether there is at least one marker 14 in the travel image each time the travel image is captured by the vehicular camera 40 and sent therefrom in step S200.

For example, the recognition task includes a known pattern matching of the travel image with each of template pattern images stored in, for example, the storage unit 43; each of the template pattern images shows a corresponding one of various patterns of the markers 14.

In step S200, upon determining that there is at least one marker 14 in the travel image, the camera ECU 42 serves as the marker recognition unit 50 to recognize the at least one marker 14 in the travel image, and recognizes the marker ID of the at least one marker 14.

Then, the camera ECU 42 serves as the marker recognition unit 50 to update the recognized marker list stored in the storage unit 43 to thereby add the newly recognized marker ID to the recognized marker list in step S200.

Note that, if the marker recognition unit 50 of the camera ECU 42 recognizes the marker ID of the at least one marker 14 for the first time, the marker recognition unit 50 creates the recognized marker ID list based on the recognized marker ID in the storage unit 43.

Next, the autonomous drive ECU 46 estimates the current position of the parking target vehicle 16 in accordance with the map data and the location of the at least one marker 14 included in the marker ID list, thus storing the estimated position of the parking target vehicle 16 to correlate with the corresponding marker ID recognized in step S200 in step S202.

In step S202, the autonomous drive ECU 46 can be configured to receive global positioning system (GPS) signals, which are sent from GPS satellites constituting a global navigation satellite system (GNSS), and estimate the current position of the parking target vehicle 16 in accordance with the received GPS signals.

Subsequently, the autonomous drive ECU 46 determines whether the parking target vehicle 16 has reached the selected one of the parking spaces 18 specified by the travel route data in step S204.

In response to determination that the parking target vehicle 16 has not reached the selected one of the parking spaces 18 (NO in step S204), the marker-ID list transmitting routine proceeds to step S200, and the operations in steps S200 to S204 are repeatedly carried out.

Otherwise, in response to determination that the parking target vehicle 16 has reached the selected one of the parking spaces 18 (YES in step S204), the marker-ID list transmitting routine proceeds to step S206.

In step S206, the camera ECU 42 or the autonomous drive ECU 46 transmits, to the AVP local control apparatus 22 through the communication device 48, the recognized marker ID list whose marker IDs respectively correlating with the estimated positions of the parking target vehicle 16 in step S206. Thereafter, the marker-ID transmitting routine is terminated.

The camera ECU 42 or the autonomous drive ECU 46 can transmit, to the AVP local control apparatus 22 through the communication device 48, the recognized marker ID list each time the first or new marker ID has been added to the recognized marker ID list.

That is, if the marker recognition unit 50 fails to detect a marker 14 or detects a marker 14 but fails to recognize the marker ID, the marker ID of the marker 14 is not transmitted to the AVP local control apparatus 22.

Next, the following describes an example of the configuration of the AVP local control apparatus 22 with reference to FIG. 2.

The AVP local control apparatus 22 is designed as an information processing unit comprised of a control server 60, a display 62, an input device 64 including a keyboard and/or a pointing device, such as a mouse, and a storage unit 66.

Specifically, the AVP local control apparatus 22 is configured to oversee (i) the position and traveling state of the parking target vehicle 16, and (ii) whether each of the parking spaces 18 is occupied or empty in accordance with various data items transmitted from the parking target vehicle 16 and the parking facility 20.

That is, the storage unit 66 of the AVP local control apparatus 22 has stored the map data of the parking garage 12, the marker IDs of all the respective markers 14, and information, i.e. parking information, about whether each of the parking spaces 18 is occupied or empty. In particular, the control server 60 updates, based on, for example, the monitor images transmitted from the parking facility 20, the parking information in response to the parking target vehicle 16 being parked in a selected one of the parking spaces 18.

As illustrated in FIG. 2, the control server 60 functionally includes a travel route determiner 70, a marker determiner 72, an illumination determiner 74, a determination result outputting unit 78, and a communication unit 80. Each of the components 70, 72, 74, 76, 78, and 80 installed in the control server 60 can be implemented by at least one hardware device, or at least one programmed logic circuit, or at least one processor that runs programs stored in, for example, a non-transitory tangible storage media, or the combination of them.

For example, if one of the components 70, 72, 74, 76, 78, and 80 is comprised of a hardware electronic circuit, the hardware electronic circuit can be implemented by at least one digital circuit including many logic gates and/or an analog circuit.

The travel route determiner 70 is configured to determine travel route data, which represents a selected travel route of the parking target vehicle 16 from the current position of the parking target vehicle 16 to a selected empty parking space 18 in the parking spaces 18, in accordance with (i) The estimated current position of the parking target vehicle 16, which is transmitted from the parking target vehicle 16

(ii) The map data of the parking garage 12

(iii) Information indicative of how the markers 14 are recognized by the marker recognition unit 50.

The marker determiner 72 is configured to perform a marker determination task of determining, based on the result of recognition of the markers 14 by the marker recognition unit 50, whether there is a problem in recognition of at least one marker 14. This enables the marker determiner 72 to determine whether there is need of maintenance of at least one marker 14.

That is, the marker determiner 72 deter mines that there is a problem in recognition of at least one marker 14 when the at least one marker 14, which should be detected by the vehicular camera 40 and recognized by the camera ECU 42, is not detected by the vehicular camera 40 or is not recognized by the camera ECU 42.

In the first embodiment, although the marker recognition unit 50 has recognized a selected marker 14, but the marker recognition unit 50 fails to recognize the marker ID of the selected marker 14 so that the marker ID of the selected marker 14 is not included in the recognized marker ID list, the marker determiner 72 determines that there is a problem or trouble in recognition of the selected marker 14.

For example, the marker determiner 72 compares the recognized marker IDs of the recognized marker ID list with the marker IDs of all the respective markers 14 stored in the storage unit 66 to accordingly determine that there is a problem in recognition of at least one marker 14, whose marker ID is not included in the recognized marker ID list.

The illumination determiner 74 is configured to perform an insufficient illumination determination task of determining whether there is insufficient illumination around each marker 14.

For example, the illumination determiner 74 is configured to determine whether there is insufficient illumination around each marker 14 in accordance with at least one of 1. The illumination data item for the corresponding marker 14 estimated by the illumination estimation unit 54

2. The insufficient illumination data item correlating with at least one lighting device 34

Specifically, the illumination determiner 74 determines whether the estimated illumination level correlating with the marker ID of each marker 14 is less than or equal to a predetermined threshold illumination level. Then, the illumination determiner 74 determines that there is insufficient illumination around at least one marker 14 upon determining that the estimated illumination level correlating with the marker ID of the at least one marker 14 is less than or equal to the predetermined threshold illumination level.

That is, upon determining that the estimated illumination level correlating with the marker ID of the at least one marker 14 is less than or equal to the predetermined threshold illumination level, the illumination determiner 74 determines that at least one lighting device 34 located adjacent to the at least one marker 14 has improper illumination.

In addition, the illumination determiner 74 identifies that at least one lighting device 34, which corresponds to the insufficient illumination data item indicative of the insufficient illumination flag being set to 1, has improper illumination.

The determination result outputting unit 78 is configured to visibly and/or audibly output a result of the marker determination task carried out by the marker determiner 72 and a result of the insufficient illumination determination task carried out by the illumination determiner 74.

For example, the determination result outputting unit 78 according to the first embodiment displays, on the display 62, the result of the marker determination task carried out by the marker determiner 72 and the result of the insufficient illumination determination task carried out by the illumination determiner 74. This enables an operator or manager of the AVP system 10 to visibly check how the AVP system 10 is working in accordance with the displayed result of the marker determination task and the displayed result of the insufficient illumination determination task.

The determination result outputting unit 78 can be configured to output the result of the marker determination task and the result of the insufficient illumination determination task to (i) information output devices of one or more other parking target vehicles 16 traveling in the parking garage 12 and/or (ii) a mobile terminal carried by a parking manager of the parking garage 12.

The communication unit 80 is communicable with, by wire or radio, the components 62, 64, and 66 of the AVP local control apparatus 22, and also is communicable with, by radio, the components of the parking facility 20 and with, by radio, the parking target vehicle 16.

In particular, the communication unit 80 is configured to receive various data items transmitted from the parking facility 20 and/or the parking target vehicle 16, and to transmit, to the parking target vehicle 16, the map data and the travel route data.

The storage unit 66 is comprised of, for example, a read only memory (ROM) and a random-access memory (RAM), and is communicably connected to the control server 60.

The storage unit 66, which serves as, for example, a non-transitory computer-readable storage media, has stored various programs including a marker diagnostic program.

The control server 60 is programmed to run some programs allocated therefor to thereby perform predetermined routines respectively corresponding to the programs.

Figure 5:
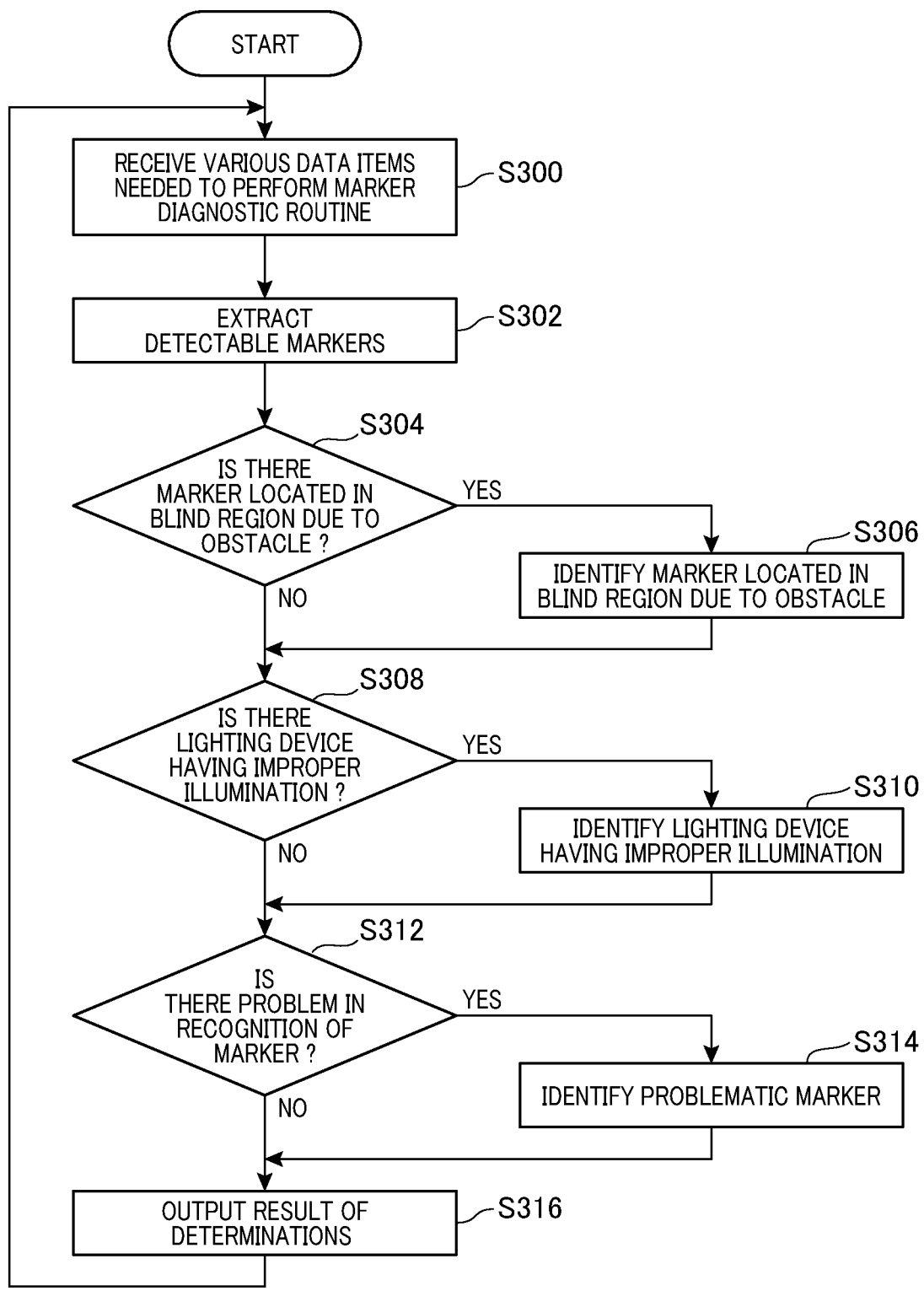
FIG. 5 is a flowchart schematically illustrating a marker diagnostic program carried out by a control server illustrated in FIG. 2 according to the first embodiment.

In particular, the control server 60 is programmed to run the marker diagnostic program stored in the storage unit 66 to thereby perform a marker diagnostic routine illustrated in, for example, FIG. 5.

For example, each time an AVP vehicle 16 has just entered the parking garage 12 via the entrance/exit gate G as a parking target vehicle 16, the control server 60 is programmed to start the marker diagnostic routine for the parking target vehicle 16.

When starting the marker diagnostic routine for each parking target vehicle 16, the control server 60 receives, via the communication unit 80, various data items needed to perform the marker diagnostic routine, which are transmitted from the parking facility 20 and the parking target vehicle 16 in step S300.

The various data items include

1. The current position of the parking target vehicle 16 transmitted from the parking target vehicle 16
2. The recognized marker ID list transmitted from the parking target vehicle 16
3. The illumination data item for each marker 14 estimated by the illumination estimation unit 54 transmitted from the parking target vehicle 16
4. The obstacle location data indicative of the location of the at least one obstacle in the parking garage 12 transmitted from the parking target vehicle 16
5. The insufficient illumination data transmitted from the parking facility 20

The camera ECU 42 and the autonomous drive ECU 46 of the parking target vehicle 16 can be configured to transmit, to the AVP local control apparatus 22, the corresponding data items needed to perform the marker diagnostic routine when the parking target vehicle 16 has reached the selected one of the parking spaces 18.

Next, the control server 60 serves as the marker determiner 72 to perform a detectable marker extraction task that extracts, from all the markers 14, one or more marker IDs of one or more markers 14 that are expected to be detected by the parking target vehicle 16 during the parking target vehicle 16 traveling on the travel route for the parking target vehicle 16 in step S302. The extracted one or more markers 14 will be referred to as detectable markers 14. In particular, the marker determiner 72 performs the detectable marker extraction task in accordance with the map data, the travel route data, and the marker IDs of all the respective markers 14.

In step S302, the control server 60 serves as the marker determiner 72 to make a list of the marker IDs of the one or more detectable markers 14, thus storing the list, which will be referred to as a detectable marker ID list, in the storage unit 66.

Subsequently, the control server 60 serves as the marker determiner 72 to determine whether there is at least one obstacle located between the travel route of the parking target vehicle 16 and each detectable marker 14 in step S304.

In response to determination that there is at least one obstacle located between the travel route of the parking target vehicle 16 and at least one detectable marker 14 (YES in step S304), the marker diagnostic routine proceeds to step S306. Otherwise, in response to determination that there is not any obstacle located between the travel route of the parking target vehicle 16 and each detectable marker 14 (NO in step S304), the marker diagnostic routine proceeds to step S308.

Specifically, in step S304, the control server 60 serves as the marker determiner 72 to determine, based on the obstacle location data, the detectable marker ID list, and the travel route data, whether the at least one obstacle is located to face any of the detectable markers 14 and a corresponding part of the travel route while the at least one obstacle and any of the detectable markers 14 are linearly aligned with each other.

In response to determination that the at least one obstacle is located to face any of the detectable markers 14 and a corresponding part of the travel route while the at least one obstacle and any of the detectable markers 14 are linearly aligned with each other, the marker determiner 72 determines that there is at least one detectable marker 14 located in a blind region of the parking floor PF from the view of the at least one vehicular camera 40 of the parking target vehicle 16 (YES in step S304).

Otherwise, in response to determination that the at least one obstacle is not located to face any of the detectable markers 14 and a corresponding part of the travel route or the at least one obstacle and any of the detectable markers 14 are not linearly aligned with each other, the marker determiner 72 determines that no detectable markers 14 are each located in a blind region of the parking floor PF from the view of the at least one vehicular camera 40 of the parking target vehicle 16 (NO in step S304).

In response to affirmative determination in step S304, the control server 60 serves as the marker determiner 72 to identify the marker ID of the at least one detectable marker 14 that is difficult to recognize in step S306. Thereafter, the marker diagnostic routine proceeds to step S308.

In step S308, the control server 60 serves as the illumination determiner 74 to determine, based on the illumination data item for each marker 14 and insufficient illumination data, whether there is at least one lighting device 34 having improper illumination.

In response to determination that there is at least one lighting device 34 having improper illumination (YES in step S308), the marker diagnostic routine proceeds to step S310. Otherwise, in response to determination that there is not any lighting device 34 having improper illumination (NO in step S308), the marker diagnostic routine proceeds to step S312.

Specifically, the control server 60 serves as the illumination determiner 74 to determine whether the estimated illumination level of the marker-surrounding region around at least one marker 14 is less than or equal to the predetermined threshold illumination level, and determine that at least one lighting device 34 has improper illumination in response to determination that 1. The estimated illumination level of the marker-surrounding region around the at least one marker 14 is less than or equal to the predetermined threshold illumination level
2. The at least one lighting device 34 illuminating the marker-surrounding region around the at least one marker 14 has improper illumination (YES in step S308).

Similarly, the control server 60 serves as the illumination determiner 74 to determine that at least one lighting device 34 has improper illumination in response to determination that the insufficient illumination data for the at least one lighting device 34, which has the insufficient illumination flag being set to 1, has been transmitted from the parking facility 20 (YES in step S308).

In response to affirmative determination in step S308, the control server 60 serves as the illumination determiner 74 to identify the at least one lighting device 34 having improper illumination in step S310. Thereafter, the marker diagnostic routine proceeds to step S312.

In step S312, the control server 60 serves as the marker determiner 72 to determine, based on the recognized marker ID list and the detectable marker ID list, whether there is a problem in recognition of at least one marker 14.

In response to deter urination that there is a problem in recognition of at least one marker 14 (YES in step S312), the marker diagnostic routine proceeds to step S314. Otherwise, in response to determination that there are no problems in recognition of any marker 14 (NO in step S312), the marker diagnostic routine proceeds to step S316.

Specifically, the control server 60 serves as the marker deter miner 72 to check the recognized marker ID list against the detectable marker ID list to thereby determine whether there is at least one marker ID that is included in the detectable marker ID list but is not included in the recognized marker ID list.

In response to determination that at least one marker ID that is included in the detectable marker ID list but is not included in the recognized marker ID list, the marker determiner 72 determines that there is a problem in recognition of at least one marker 14, which will be referred to as at least one problematic marker 14, having the at least one marker ID (YES in step S312) as long as 1. The at least one problematic marker 14 is not identified as a marker 14 located in the blind region
2. The identified at least one lighting device 34 is not located in the marker-surrounding region around the at least one problematic marker 14

In response to affirmative determination in step S312, the control server 60 serves as the marker determiner 72 to identify the at least one problematic marker 14 in step S314. Thereafter, the marker diagnostic routine proceeds to step S316.

In step S316, the control server 60 serves as the determination result outputting unit 78 to display, on the display 62, a map image based on the map data, which visually represents the interior of the parking garage 12, and display, on the map image, the at least one problematic marker 14, the location of the at least one obstacle, and the at least one lighting device 34 having improper illumination. Thereafter, the marker diagnostic routine returns to step S300, and the control server 60 is programmed to start the marker diagnostic routine from the operation in step S300 when a next AVP vehicle 16 has entered the parking garage 12 as a parking target vehicle 16.

For example, the control server 60 sets a maintenance flag in the storage unit 66, which represents the necessity of maintenance for each of the at least one problematic marker 14, the at least one obstacle, and the at least one lighting device 34 having improper illumination. This setting of the maintenance flag causes the control server 60 to suspend the parking facility 20 by, for example, closing the entrance/exit gate G to thereby prevent the AVP vehicles 16 from entering the parking garage 12.

The marker diagnostic routine set forth above makes it possible to easily identify at least one marker 14 with a need for maintenance in all the markers 14 used for navigating the AVP vehicles 16 in the parking garage 12.

In particular, the operations in steps S304 to S312 of the marker diagnostic routine makes it possible to separately determine that there is a problem in recognition of at least one marker 14 due to 1. At least one marker 14 being difficult to recognize
2. An adverse effect of at least one obstacle
3. At least one lighting device 34 having improper illumination For example, when one or more parking managers of the parking garage 12 visually recognizes the at least one problematic marker 14, the location of the at least one obstacle, and the at least one lighting device 34 having improper illumination displayed by the display 62, the one or more parking managers performs maintenance of the at least one problematic marker 14, removal of the at least one obstacle, and maintenance of the at least one lighting device 34 having improper illumination.

For example, as the maintenance of the at least one problematic marker 14, the one or more parking managers remove stains on the at least one problematic marker 14 or swap the at least one problematic marker 14 for a new marker 14 or eliminate the at least one problematic marker 14 and thereafter repaints a new marker 14 on the corresponding location on the parking floor PF.

As the maintenance of the at least one lighting device 34 having improper illumination, the one or more parking managers repair the at least one lighting device 34.

Thereafter, the one or more parking managers operates the input device 64 to enter information indicative of completion of maintenance for each of the at least one problematic marker 14, the at least one obstacle, and the at least one lighting device 34 having improper illumination.

The entered information is sent from the input device 64 to the control server 60, so that the control server 60 resets the maintenance flag for each of the at least one problematic marker 14, the at least one obstacle, and the at least one lighting device 34 having improper illumination. This resetting of the maintenance flag causes the control server 60 to return from the suspended state of the parking facility 20 by, for example, opening the entrance/exit gate G to thereby permit the AVP vehicles 16 to enter the parking garage 12.

Additionally, the control server 60 serves as the determination result outputting unit 78 to store the at least one problematic marker 14, the location of the at least one obstacle, and the at least one lighting device 34 having improper illumination in the storage unit 66 as a diagnostic dataset.

Then, the travel route determiner 70 of the control server 60 can be configured to determine the travel route data of each of next parking target vehicles 16 from the current position thereof to a selected empty parking space 18 in the parking spaces 18 in accordance with (i) The estimated current position of each of the next parking target vehicles 16
(ii) The map data of the parking garage 12
(iii) Information indicative of how the markers 14 are recognized by the marker recognition unit 50
(iv) The diagnostic data set This configuration enables the travel route of each of the next parking target vehicles 16 to be determined while avoiding the usage of the at least one problematic marker 14, making it possible to further improve the safety of autonomous traveling of each of the VAP vehicles 16 in the parking garage 12.

This configuration also enables the travel route of each of the next parking target vehicles 16 to be determined while avoiding the usage of the at least one marker 14 being difficult to recognize due to the existence of the at least one obstacle, making it possible to further improve the safety of autonomous traveling of each of the AVP vehicles 16 in the parking garage 12.

Additionally, this configuration enables the travel route of each of the next parking target vehicles 16 to be determined while avoiding the usage of the marker-surrounding region illuminated by the at least one lighting device 34 having improper illumination, making it possible to further improve the safety of autonomous traveling of each of the AVP vehicles 16 in the parking garage 12.

The control server 60 serves as the determination result outputting unit 78 to output the diagnostic dataset to one or more other parking target vehicles 16 traveling in the parking garage 12. Then, the control server 60 of each of the one or more other parking target vehicles 16 can modify the travel route data such that the modified travel route data enables the corresponding parking target vehicle 16 to travel without using the at least one problematic maker 14.

Second Embodiment

Figure 6:
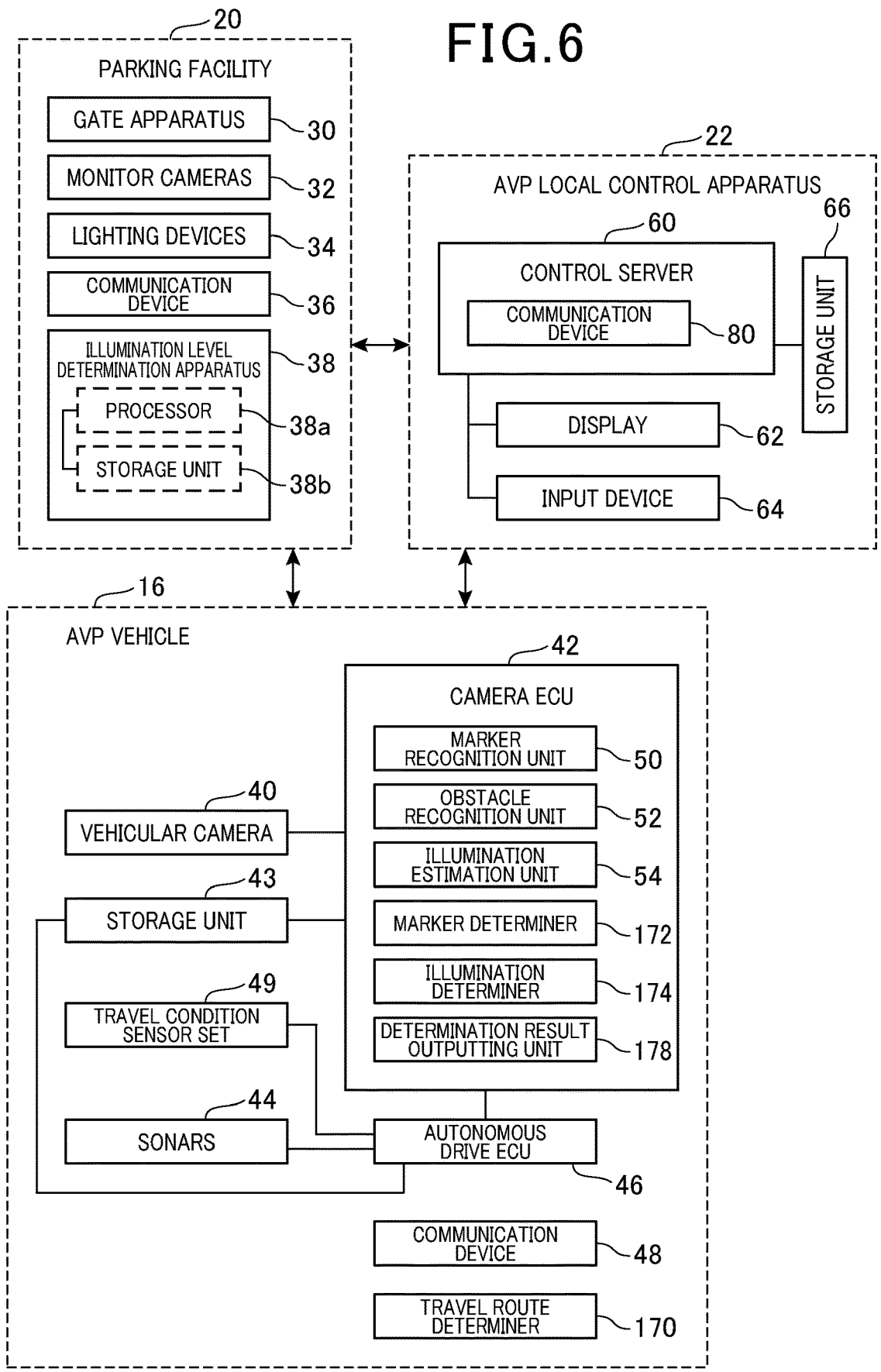
FIG. 6 is a block diagram schematically illustrating an example of the electrical configuration of an AVP system according to the second embodiment of the present disclosure.

The following describes an AVP system 10A according to the second embodiment of the present disclosure with reference to FIG. 6. The configuration and functions of the AVP system 10A according to the second embodiment are mainly different from those of the AVP system 10 according to the first embodiment illustrated in FIG. 2 by the following points. The following therefore mainly describes the different points.

The AVP system 10A of the second embodiment is configured such that the travel route determiner 70, marker determiner 72, illumination determiner 74, and determination result outputting unit 78, which have been installed in the AVP local control server 22 according to the first embodiment, are installed in each AVP vehicle 16.

The travel route determiner 70, marker determiner 72, illumination determiner 74, and determination result outputting unit 78 installed in each AVP vehicle 16 according to the second embodiment are respectively renumbered as a travel route determiner 170, a marker determiner 172, an illumination determiner 174, and a determination result outputting unit 178 installed in the corresponding AVP vehicle 16.

In particular, the marker determiner 172, illumination determiner 174, and determination result outputting unit 178 are installed in the camera ECU 42 of each AVP vehicle 16, and the ravel route determiner 170 is installed in the corresponding AVP vehicle 16 or the autonomous drive ECU 46 of the corresponding AVP vehicle 16.

This results in the insufficient illumination data item, which is a result of determination by the determination apparatus 38, being directly sent to each AVP vehicle 16 when the corresponding AVP vehicle 16 is entering the parking garage 12 or being sent to the corresponding AVP vehicle 16 via the AVP local control apparatus 22.

This therefore enables the camera ECU 42 to perform the marker diagnostic routine.

That is, the storage unit 43 of the parking target vehicle 16 has stored various programs including the marker diagnostic program.

The camera ECU 42 is programmed to run the marker diagnostic program stored in the storage unit 43 to thereby perform the marker diagnostic routine illustrated in, for example, FIG. 5. The marker diagnostic program can be electronically distributed to the parking target vehicle 16 as an application program.

The travel route determiner 170, marker determiner 172, illumination determiner 174, and determination result outputting unit 178 installed in the parking target vehicle 16 are basically functionally equivalent to the respective travel route determiner 70, marker determiner 72, illumination determiner 74, and determination result outputting unit 78 according to the first embodiment except for the following points. We therefore mainly describe the following points.

The determination result outputting unit 78 is configured to output, to the AVP local control apparatus 22, the at least one problematic marker 14, the location of the at least one obstacle, and the at least one lighting device 34 having improper illumination as the diagnostic dataset.

Then, the control server 60 of the AVP local control apparatus 22 is configured to receive the diagnostic dataset, and display the received diagnostic dataset on the display 62.

The determination result outputting unit 78 is also configured to directly output the diagnostic dataset to one or more other parking target vehicles 16 or to output the diagnostic dataset to one or more other parking target vehicles 16 via the AVP local control apparatus 22.

When the parking target vehicle 16 is entering the parking garage 12, the travel route determiner 170 is configured to determine travel route data, which represents a selected travel route of the parking target vehicle 16 from the current position of the parking target vehicle 16 to a selected empty parking space 18 in the parking spaces 18, in accordance with (i) The estimated current position of the parking target vehicle 16

(ii) The map data of the parking garage 12 transmitted from the AVP local control apparatus 22

(iii) The information indicative of how the markers 14 have been recognized by the marker recognition unit 50

In addition, the travel route determiner 170 can be configured to modify the travel route data in response to receiving the diagnostic data set transmitted from one of the other parking target vehicles 16 such that the modified travel route data enables the corresponding parking target vehicle 16 to travel without using the at least one problematic maker 14.

The travel route determiner 170 can be installed in the AVP local control apparatus 22 without being installed in each AVP vehicle 16.

Third Embodiment

Figure 7:
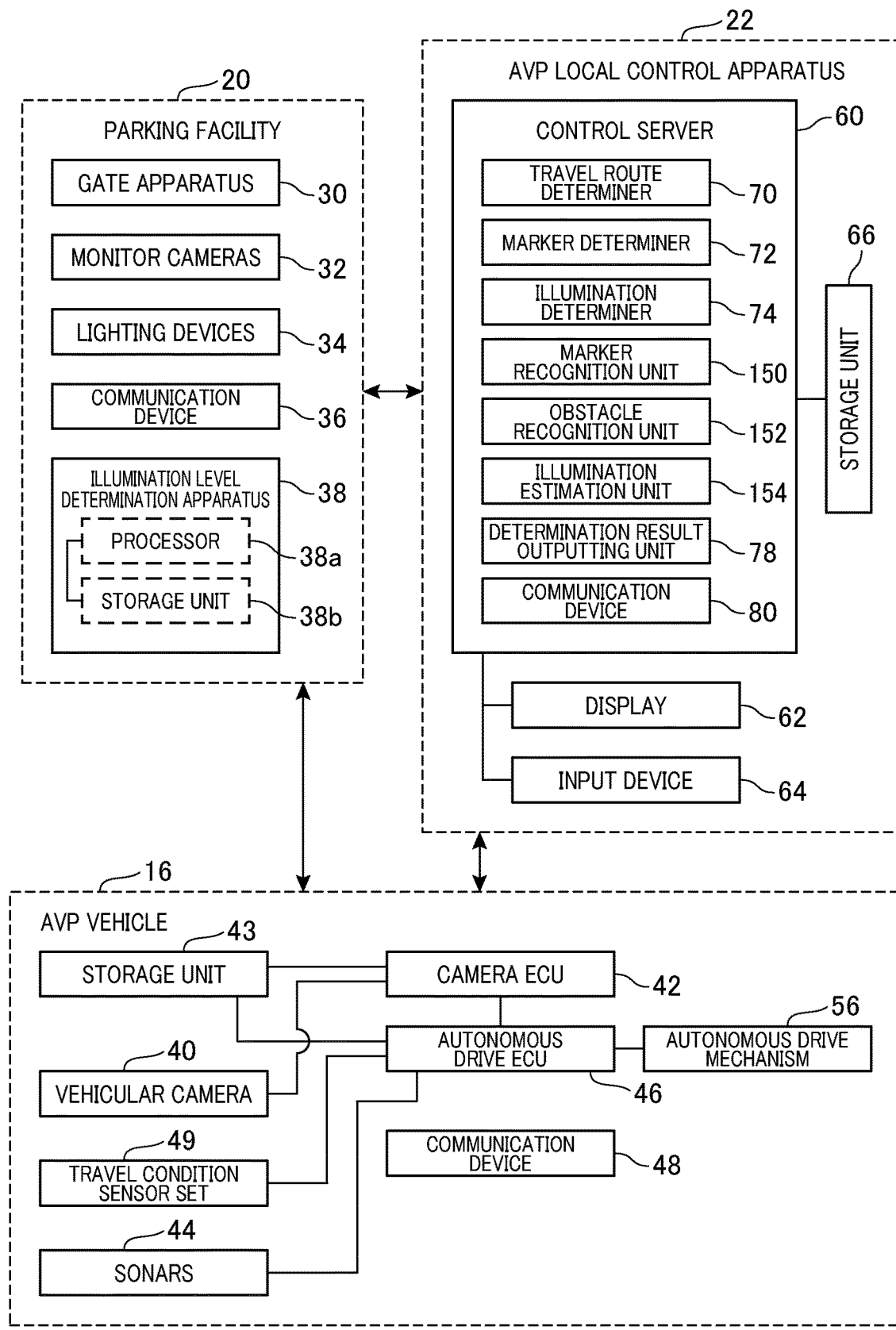
FIG. 7 is a block diagram schematically illustrating an example of the electrical configuration of an AVP system according to the third embodiment of the present disclosure.

The following describes an AVP system 10B according to the third embodiment of the present disclosure with reference to FIG. 7. The configuration and functions of the AVP system 10B according to the third embodiment are mainly different from those of the AVP system 10 according to the first embodiment illustrated in FIG. 2 by the following points. The following therefore mainly describes the different points.

The AVP system 10B of the third embodiment is configured such that each of the monitor cameras 32 installed in the parking facility 20 serves as a first detection unit for detecting at least one marker 14 and also serves as a second detection unit for detecting obstacles, at least one of which inhibits detection of at least one marker 14.

Additionally, the marker recognition unit 50, obstacle recognition unit 52, and illumination estimation unit 54, which have been installed in each AVP vehicle 16 according to the first embodiment, are installed in the AVP local control apparatus 22.

Specifically, the marker recognition unit 50, obstacle recognition unit 52, and illumination estimation unit 54 installed in the AVP local control apparatus 22 according to the third embodiment are respectively renumbered as a marker recognition unit 150, an obstacle recognition unit 152, and an illumination estimation unit 154 installed in the control server 60 of the AVP local control apparatus 22.

Each of the monitor cameras 32 is configured to transmit, to the AVP local control apparatus 22 via the communication device 36, the monitor image in a predetermined data format each time the corresponding monitor camera 32 captures the monitor image.

The processor 38a of the determination apparatus 38 is configured to transmit, to the AVP local control apparatus 22, the at least one insufficient illumination data item if the at least one insufficient illumination data item has been stored in the storage unit 38b.

In other words, the parking facility 20 transmits the monitor images captured by each monitor camera 32 and the at least one insufficient illumination data item to the AVP local control apparatus 22.

The marker recognition unit 150, obstacle recognition unit 152, and illumination estimation unit 154 installed in the control server 60 of the AVP local control apparatus 22 are basically functionally equivalent to the marker recognition unit 50, obstacle recognition unit 52, and illumination estimation unit 54 installed in the control server 60 of the AVP local control apparatus 22 according to the first embodiment except for the following points. We therefore mainly describe the following points.

The marker recognition unit 150 is configured to perform the known recognition task of the monitor images captured by the monitor cameras 32 to thereby recognize the markers 14.

The obstacle recognition unit 152 is configured to perform the known recognition task of the monitor images captured by the monitor cameras 32 to thereby determine whether there is at least one obstacle located to inhibit detection of at least one marker 14.

The obstacle recognition unit 152 can be configured to perform the known recognition task of acoustic echo pulses resulting from reflection of acoustic pulses from one or more objects including at least one obstacle located to inhibit detection of at least one marker 14; the acoustic pulses are outputted from each sonar 44 mounted to the AVP vehicle 16.

The illumination estimation unit 154 is configured to estimate, based on the monitor images captured by the monitor cameras 32, the illumination level of a marker-surrounding region around each marker 14, and generate an illumination level for each marker 14; the illumination data item for each marker 14 includes the estimated illumination level of the marker-surrounding region around the corresponding marker 14 correlating with the marker ID of the corresponding marker 14.

Modifications

The present disclosure is not limited to the above first to third embodiments set forth above, and can be variously modified for example as follows without changing the scope of the present disclosure.

In the first embodiment, although the marker recognition unit 50 has recognized a selected marker 14, but the marker recognition unit 50 cannot recognize the marker ID of the selected marker 14 so that the marker ID of the selected marker 14 is not included in the recognized marker ID list, the marker determiner 72 is configured to determine that there is a problem in recognition of the selected marker 14. The present disclosure is not limited to the configuration.

Specifically, the marker determiner 72 can be configured to determine whether each marker 14 is detected at a corresponding predetermined original installation position on the parking floor PF at which the corresponding marker 14 should be located, and to determine that there is a problem in recognition of at least one marker 14 upon determining that the at least one marker 14 is not detected at the predetermined original installation position.

As another example of the determination in step S312, the marker determiner 72 can be configured to 1. Obtain a percentage of recognition of the black-colored quadrangular base and one or more white-colored quadrangular marks printed on the label surface of each marker 14 to the whole of the label surface of the corresponding marker 2. Determine whether the obtained percentage of recognition of each marker 14 is more than or equal to a threshold percentage 3. Determine that there is a problem in recognition of a marker 14 upon determining that the obtained percentage of recognition of the marker 14 is less than the threshold percentage As a further example of the determination in step S312, the marker determiner 72 can be configured to 1. Obtain a value of a color parameter, such as a hue, a saturation or an intensity, or a brightness, of the label surface of each marker 14

2. Determine whether the obtained value of the color parameter is within a predetermined color range 3. Determine that there is a problem in recognition of a marker 14 upon determining that the obtained value of the color parameter is outside the predetermined color range The illumination level determination device 38 can be eliminated from the parking facility 20. In this modification, the illumination determiner 74 can determine, based on the illumination data item for each marker 14 whether there is at least one lighting device 34 having improper illumination.

The AVP local control apparatus 22 according to each of the first and third embodiment is configured to determine the travel route data of the parking target vehicle 16, and transmit the travel route data to the parking target vehicle 16, but the parking target vehicle 16 can be configured to determine the travel route data thereof in accordance with (i) The estimated current position of the parking target vehicle 16

(ii) The map data of the parking garage 12 transmitted from the AVP local control apparatus 22

(iii) Information indicative of how the markers 14 are recognized by the marker recognition unit 50

The flow of operations in each of the illumination level determination routine, marker-ID list transmitting routine, and marker diagnostic routine described above can be modified within the scope of the present disclosure.

For example, one or more non-essential steps can be eliminated from each of the illumination level determination routine, marker-ID list transmitting routine, and marker diagnostic routine within the scope of the present disclosure.

Similarly, one or more new steps can be added to each of the illumination level determination routine, marker-ID list transmitting routine, and marker diagnostic routine within the scope of the present disclosure.

Additionally, the order of some steps in each of the illumination level determination routine, marker-ID list transmitting routine, and marker diagnostic routine can be changed to another order within the scope of the present disclosure.

While illustrative embodiments of the present disclosure have been described herein, the present disclosure is not limited to the embodiments and their modifications described herein, but includes any and all embodiments having modifications, omissions, combinations (e.g., of aspects across various embodiments), adaptations and/or alterations as would be appreciated by those in the art based on the present disclosure within the scope of the present disclosure.

For example, each of the technical features described in the embodiment and its modifications can be replaced with a known structure having the same function as the corresponding technical feature. Each of the technical features described in the embodiment and its modifications can also be combined with at least one of the other technical features. At least one of the technical features described in the embodiment and its modifications can further be eliminated unless the at least one of the technical features is described as an essential element in the present specification.

What is claimed is:

1. An automatic parking system for navigating a vehicle in a parking garage to park the vehicle in a parking space, the automatic parking system comprising:

a marker recognizing unit configured to perform recognition of a predetermined number of markers located respectively at predetermined locations in the parking garage, each of the predetermined number of markers serving as a navigation landmark to navigate the vehicle;
a marker determiner configured to perform determination of whether there is a problem in recognition of at least one marker in the predetermined number of markers in accordance with information resulting from the recognition performed by the marker determiner; and
an output unit configured to output marker state information resulting from the determination performed by the marker determiner; and
a travel route determiner configured to:
exclude, from the predetermined number of markers, the at least one marker in which it is determined that there is a problem in recognition of the at least one marker; and
determine the travel route of the vehicle toward the parking space in accordance with the predetermined number of markers, from which the at least one marker has been excluded.

2. The automatic parking system according to claim 1, wherein:
the marker recognizing unit is configured to:
perform the recognition of the predetermined number of markers to thereby determine a failure of detecting the at least one marker at the corresponding predetermined location; and
the marker determiner is configured to determine that there is a problem in recognition of the at least one the marker in accordance with, as the information resulting from the recognition, the failure of detecting the at least one marker at the corresponding predetermined location.

3. The automatic parking system according to claim 1, further comprising:
an illumination determiner configured to perform determination of whether there is insufficient illumination around each of the predetermined number of markers, wherein:
the output unit is configured to output illumination information resulting from the determination performed by the illumination determiner in addition to the marker state information resulting from the determination performed by the marker determiner.

4. The automatic parking system according to claim 3, wherein:
the illumination determiner is configured to:
estimate an illumination level of a region around each of the predetermined number of markers;
perform determination of whether the estimated illumination level of the region around each of the predetermined number of markers is less than or equal to a predetermined threshold illumination level to accordingly perform the determination of whether there is insufficient illumination around each of the predetermined number of markers.

5. The automatic parking system according to claim 3, wherein:
the illumination determiner is configured to:
obtain a value of an electric parameter indicative of an intensity level of light outputted from at least one lighting device installed in the parking garage; and
perform determination of whether the obtained value of the electric parameter of the intensity level of the at least one lighting device is within a predetermined intensity range to accordingly perform the determination of whether the at least one lighting device has improper illumination.

6. The automatic parking system according to claim 1, further comprising:
an obstacle detector configured to detect at least one obstacle in the parking garage; and
an obstacle determiner is configured to determine whether the detected at least one obstacle is located inhibiting detection of one or more of the predetermined number of markers in accordance with a positional relationship between the at least one obstacle and the predetermined location of each of the predetermined number of markers.

7. The automatic parking system according to claim 1, further comprising an information processing apparatus that is located outside the vehicle, and that is communicable with the vehicle,
wherein:
the marker recognizing unit is installed in the vehicle; and
the marker determiner and the output unit are installed in the information processing apparatus.

8. The automatic parking system according to claim 1, wherein:
the marker recognizing unit, the marker determiner, and the output unit are installed in the vehicle.

9. The automatic parking system according to claim 1, further comprising an information processing apparatus that is located outside the vehicle, and that is communicable with the vehicle,
wherein:
the marker recognizing unit is installed in the parking garage; and
the marker determiner and the output unit are installed in the information processing apparatus.

10. A method of determining whether there is a problem in recognition of a marker used for navigating a vehicle in a parking garage to park the vehicle in a parking space, the method comprising:
performing recognition of a predetermined number of markers located respectively at predetermined locations in the parking garage, each of the predetermined number of markers serving as a navigation landmark to navigate the vehicle;
performing determination of whether there is a problem in recognition of at least one marker in the predetermined number of markers in accordance with information resulting from the recognition performed; and
outputting marker state information resulting from the determination performed;
excluding, from the predetermined number of markers, the at least one marker in which it is determined that there is a problem in recognition of the at least one marker; and
determining the travel route of the vehicle toward the parking space in accordance with the predetermined number of markers, from which the at least one marker has been excluded.

11. A computer-readable program product comprising:
a non-transitory computer-readable storage medium; and
a set of computer program instructions stored in the computer-readable storage medium, the instructions causing a computer to:
perform recognition of a predetermined number of markers located respectively at predetermined locations in a parking garage, each of the predetermined number of markers serving as a navigation landmark to navigate a vehicle;

perform determination of whether there is a problem in recognition of at least one marker in the predetermined number of markers in accordance with information resulting from the recognition performed; and output marker state information resulting from the determination performed;

exclude, from the predetermined number of markers, the at least one marker in which it is determined that there is a problem in recognition of the at least one marker; and determine the travel route of the vehicle toward a parking space in accordance with the predetermined number of markers, from which the at least one marker has been excluded.

\* \* \* \* \*